United States Patent
Ma et al.

(10) Patent No.: US 11,474,399 B2
(45) Date of Patent: Oct. 18, 2022

(54) ALIGNMENT COATING METHOD FOR SUBSTRATE

(71) Applicant: Wuhan China Star Optoelectronics Technology Co., Ltd., Wuhan (CN)

(72) Inventors: Guizhi Ma, Wuhan (CN); Yongkal Li, Wuhan (CN)

(73) Assignee: Wuhan China Star Optoelectronics Technology Co., Ltd., Wuhan (CN)

( * ) Notice: Subject to any disclaimer, the term of this patent is extended or adjusted under 35 U.S.C. 154(b) by 0 days.

(21) Appl. No.: 16/488,591

(22) PCT Filed: May 21, 2019

(86) PCT No.: PCT/CN2019/087747
§ 371 (c)(1),
(2) Date: Aug. 25, 2019

(87) PCT Pub. No.: WO2020/215420
PCT Pub. Date: Oct. 29, 2020

(65) Prior Publication Data
US 2022/0050335 A1    Feb. 17, 2022

(30) Foreign Application Priority Data
Apr. 25, 2019 (CN) .......................... 201910336980.5

(51) Int. Cl.
*B05D 1/28* (2006.01)
*G02F 1/1337* (2006.01)

(52) U.S. Cl.
CPC ......... *G02F 1/133723* (2013.01); *B05D 1/28* (2013.01); *B05D 1/286* (2013.01); *B05D 2505/50* (2013.01); *C09K 2323/027* (2020.08)

(58) Field of Classification Search
CPC ..... G02F 1/133723; B05D 1/28; B05D 1/286; B05D 2505/50; B05D 1/32
See application file for complete search history.

(56) References Cited

U.S. PATENT DOCUMENTS

| | | | | | |
|---|---|---|---|---|---|
| 6,139,904 | A | * | 10/2000 | Yamasaki | H05K 3/4069 427/98.3 |
| 2019/0004354 | A1 | | 1/2019 | Hsiao | |
| 2019/0086747 | A1 | * | 3/2019 | Chai | G02F 1/136227 |

FOREIGN PATENT DOCUMENTS

| CN | 106950769 A | * | 7/2017 | ........... G02F 1/1337 |
|---|---|---|---|---|
| CN | 106950769 A | | 7/2017 | |
| CN | 109283717 A | | 1/2019 | |
| CN | 109545099 A | | 3/2019 | |
| CN | 109557726 A | | 4/2019 | |
| JP | 2007281450 A | * | 10/2007 | |

* cited by examiner

*Primary Examiner* — Tabatha L Penny
(74) *Attorney, Agent, or Firm* — Nathan & Associates; Menachem Nathan

(57) ABSTRACT

An alignment coating method for a substrate includes providing at least one substrate and at least one alignment plate, covering the alignment plate on to the substrate, coating polyimide liquid on the alignment plate, and transferring a polyimide liquid on the alignment plate to a region out of a blind via on the substrate according to a preset printing direction through a printing mechanism. Each of the substrates has the blind via. The alignment plate has at least one opening. The opening corresponds to the blind via.

4 Claims, 4 Drawing Sheets

ALIGNMENT COATING METHOD FOR SUBSTRATE

FIELD OF INVENTION

The present disclosure relates to a display technical field, and specific to an alignment coating structure and an alignment coating method for a substrate.

BACKGROUND OF INVENTION

With the popularity of "full screen" mobile phone design, increasing a screen-to-body ratio is a general trend. In order to increase the screen-to-body ratio, there are a variety of designed structures, from the initial "straight bangs" to "widow's peak or waterdrop screen", and the afterwards, through-hole under-display camera design.

However, during increase of the screen-to-body ratio, it also faces cost pressures. Making holes as few as possible to control cost effectively, is the origin of a display design with a blind via. The structure is to omit punching a hole on a glass panel to reduce production cost.

A liquid crystal display panel is generally coated polyimide (PI) liquid on a thin film transistor substrate and a color film substrate, and through rubbing or photoetching process to form a pretilt angle, thereby providing a hosting angle for liquid crystal molecules. The coating process of the prior art is mainly through the following method: distributing PI liquid homogeneously on an alignment plate (Asahi Photosensitive Resin plate, APR plate), and then through the alignment plate to make the PI liquid pass through a roller to transfer on to the thin film transistor or the color film substrate and then finishes an alignment coating of polyimide.

In prior art, after an alignment coating of PI liquid, the liquid crystal molecules on a blind via are arranged regularly, making the display effect of the camera through the glass panel be insufficient, for example, issues of color shift, a Newton's ring, a rainbow pattern are generated in different visual angle directions.

In order to solve technical problems mentioned above, the present disclosure provides an alignment coating structure and an alignment coating method for a substrate, through disposing an opening on an alignment plate, making the opening face a blind via at the time of alignment coating. This makes the location where the blind via will not be printed by polyimide liquid, thereby increasing the liquid crystal arrangement randomness on the location where the blind via is, making the optical path be scattered to a certain extent, thereby prevent from occurrence of a Newton's ring or a rainbow pattern.

SUMMARY OF INVENTION

The technical solutions for solving problems mentioned above is that the present disclosure provides an alignment coating structure for a substrate, including at least one substrate, and each of the substrates has a blind via; an alignment plate has at least one opening; the alignment plate covers on the substrate, and the opening corresponds to the blind via; and a printing mechanism for transferring polyimide liquid on the alignment plate to a region out of the blind via on the substrate according to a preset printing direction.

In an embodiment of the present disclosure, the blind via is a circular hole which radius is R; the opening is a circular hole which radius ranges from R−5000 um to R+5000 um.

In an embodiment of the present disclosure, the opening is an oval hole, a short radius of the oval hole is along a direction parallel to the printing direction, a long radius of the oval hole is along a direction perpendicular to the printing direction.

In an embodiment of the present disclosure, the blind via is a circular hole which radius is R; the long radius of the oval hole ranges from R−5000 um to R+5000 um, and the short radius of the oval hole shorter than the long radius of the oval hole ranges from 0 um to 2000 um.

In an embodiment of the present disclosure, there are several substrates arranged in array, the alignment plate has a same number of printing units as the substrates, and each of the printing units has one of the openings, and each of the printing units corresponds to one of the substrates, and each of the openings on the printing unit corresponds to the blind via on the substrate.

In an embodiment of the present disclosure, the substrate includes at least one of an array substrate or a color film substrate.

The present disclosure further provides an alignment coating method for a substrate, including following steps: providing at least one substrate and at least one alignment plate, and each of the substrates having a blind via, the alignment plate having at least one opening; covering the alignment plate on to the substrate, and the opening corresponding to the blind via; coating polyimide liquid on the alignment plate; transferring the polyimide liquid on the alignment plate to a region out of the blind via on the substrate according to a preset printing direction through a printing mechanism.

In an embodiment of the present disclosure, when there are a plurality of substrates, arranging the substrates in array; the alignment plate has a same number of printing units as the substrates, and each of the printing units has one of the openings, when correspondingly covering the alignment plate on to the substrate, making each of the printing unit corresponds to one of the substrates and each of the openings on the printing unit corresponds to the blind via on the substrate.

In an embodiment of the present disclosure, wherein the blind via is a circular hole which radius is R; the opening is a circular hole which radius ranges from R−5000 um to R+5000 um; when covering the alignment plate on to the substrate, a center of the blind via is aligned to a center of the opening.

In an embodiment of the present disclosure, the opening is an oval hole, a short radius of the oval hole is along a direction parallel to the printing direction, a long radius of the oval hole is along a direction perpendicular to the printing direction; the blind via is a circular hole which radius is R; the long radius of the oval hole ranges from R−5000 um to R+5000 um, and the short radius of the oval hole shorter than the long radius of the oval hole ranges from 0 um to 2000 um; when covering the alignment plate on to the substrate, a center of the blind via is aligned to a center of the opening.

The alignment coating structure and the alignment coating method for the substrate of the present disclosure, according to a process accuracy, the radius of the opening on the alignment plate ranges from R−5000 um to R+5000 um, this is because there is differences between machines, the radii of the openings on the alignment plates have a certain difference, and according to the design, it requires to be controlled within a range from −5000 um to +5000 um to ensure the substrate around the blind via 11 can be printed to the polyimide liquid. In the actual design of the alignment plate, it is necessary to consider the deformation of the alignment plate during a printing process. Therefore, it is necessary to be considered at the time of designing. Therefore, along a printing direction, the radius of the opening needs to be deducted from the deformation value of about 0 um to 2000 um, that is, at the time of design, the opening is an oval hole, a short radius of the oval hole is along a direction parallel to the printing direction, through disposing at least one opening on an alignment plate, making the opening face a blind via at the time of alignment coating. This makes the location where the blind via will not be printed by polyimide liquid, thereby increasing the liquid crystal arrangement randomness on the location where the blind via is, making the optical path be scattered to a certain extent, thereby prevent from occurrence of a Newton's ring or a rainbow pattern.

DESCRIPTION OF DRAWINGS

To more clearly illustrate the technical solutions of the embodiments of the present disclosure, the accompanying figures of the present disclosure will be described in brief. Obviously, the accompanying figures described below are only part of the embodiments of the present disclosure, from which figures those skilled in the art can derive further figures without making any inventive efforts.

The present disclosure will be further described in detail as follow with reference to the accompanying drawings and embodiments.

DETAILED DESCRIPTION OF PREFERRED EMBODIMENTS

Figure 1:
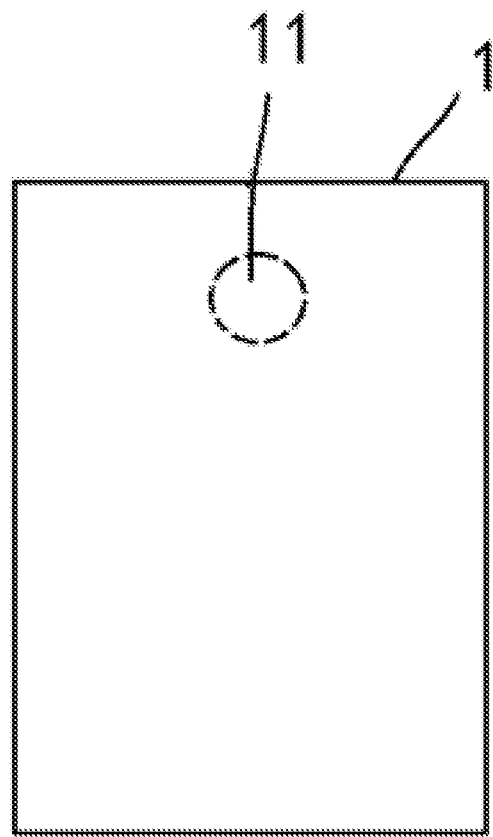
FIG. 1 is a top view of a substrate of an embodiment of the present disclosure.

The embodiments of the present disclosure are described in detail hereinafter. Examples of the described embodiments are given in the accompanying drawings, wherein the identical or similar reference numerals constantly denote the identical or similar elements or elements having the identical or similar functions. The specific embodiments described with reference to the attached drawings are all exemplary and are intended to illustrate and interpret the present disclosure, which shall not be construed as causing limitations to the present disclosure.

The First Embodiment

Figure 3:
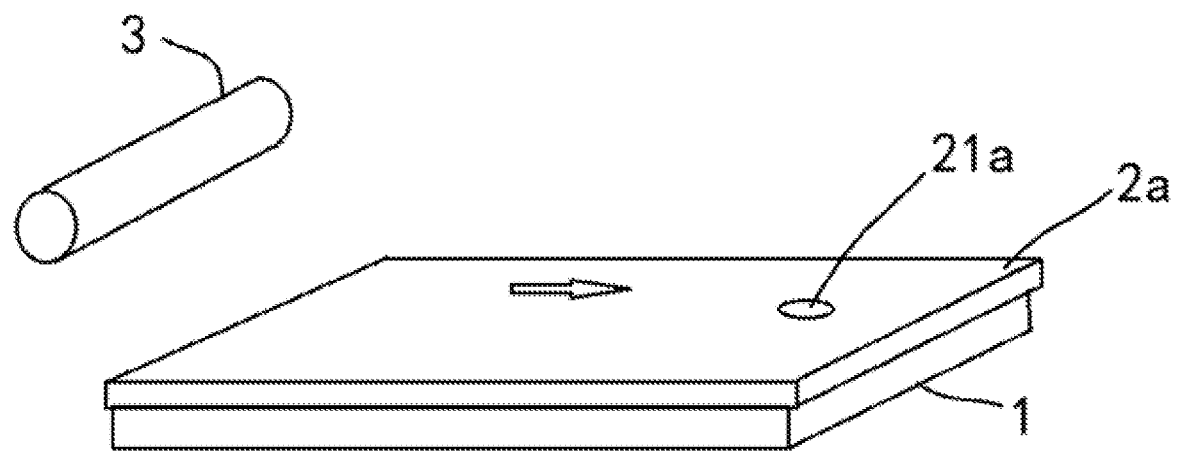
FIG. 3 is an alignment coating structure schematic diagram of the alignment plate in the first embodiment of the present disclosure, a direction of an arrow in the figure is the printing direction.

As illustrated in FIG. 3, an alignment coating structure for a substrate of the present disclosure includes a substrate 1, an alignment plate 2a and a printing mechanism 3.

As illustrated in FIG. 1, the substrate 1 includes at least one of an array substrate or a color film substrate. The substrate 1 has a blind via 11 for light transparent for an under-display camera. In this embodiment, taking one substrate 1 for an example, such as an array substrate or a color film substrate, to describe the alignment coating structure of the substrate of the present disclosure. The blind via 11 on the array substrate or the color film substrate is a circular hole which radius is R.

Figure 2:
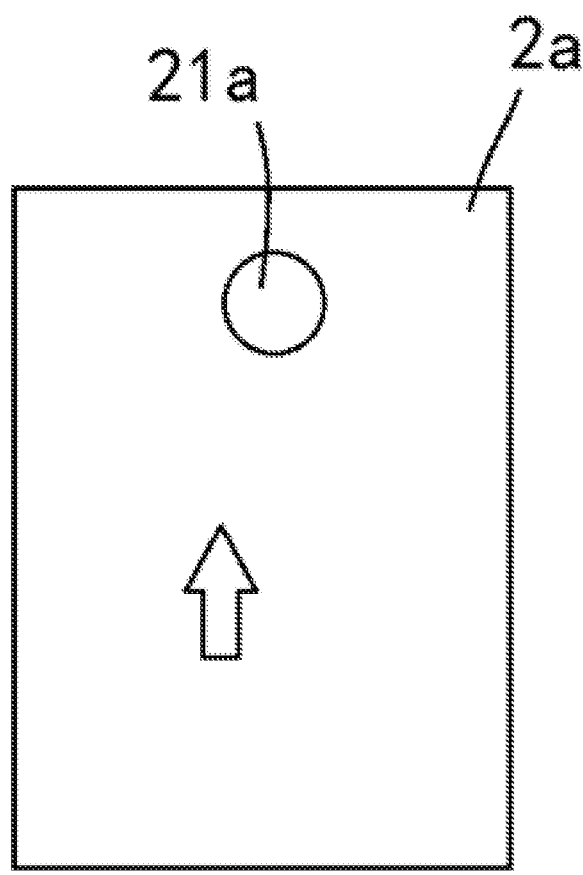
FIG. 2 is a top view of the alignment plate in the first embodiment of the present disclosure, a direction of an arrow in the figure is the printing direction.

As illustrated in FIG. 2, the alignment plate 2a has an opening 21a; before printing and coating polyimide liquid, the alignment plate 2a covers on the substrate, and the opening 21a corresponds to the blind via 11. In this embodiment, the opening 21a is a circular hole which radius ranges from R−5000 um to R+5000 um. According to a process accuracy, the radius of the opening on the alignment plate ranges from R−5000 um to R+5000 um, this is because there is differences between machines, the radii of the openings on the alignment plates have a certain difference, and according to the design, it requires to be controlled within a range from −5000 um to +5000 um to ensure the substrate around the blind via 11 can be printed to the polyimide liquid.

As illustrated in FIG. 3, in specific implementation, through a printing mechanism 3 to transfer the polyimide liquid on the alignment plate 2a to a region out of the blind via 11 on the substrate 1 according to a preset printing direction. Because the main design point of the present disclosure is at the design of the alignment plate 2a and the opening 21a, and the printing mechanism 3 is a common printing mechanism of an existing equipment, therefore the specific structure of the printing mechanism 3 will not give unnecessary details.

To clearly interpret the present disclosure, the present disclosure further provides an alignment coating method for a substrate, which specifically includes the following steps, wherein each components or devices please refer to FIG. 1 to FIG. 3.

Providing at least one substrate 1 and at least one alignment plate 2a, and each of the substrates 1 has a blind via 11, the alignment plate 2a has at least one opening 21a. The opening 21a is a circular hole.

Covering the alignment plate 2a on to the substrate 1, and the opening 21a corresponds to the blind via 11, and a center of the blind via 11 is aligned to a center of the opening 21a to ensure an accuracy of follow-up printing, making a region out of the blind via 11 where is the other region of the substrate 1 can be printed polyimide liquid in printing.

Coating polyimide liquid on the alignment plate 2a, through a printing mechanism 3 to transfer the polyimide liquid on the alignment plate to a region out of the blind via 11 on the substrate 1 according to a preset printing direction.

In this embodiment, on the substrate 1, making the location where the blind via 11 will not be printed by polyimide liquid, thereby increasing the liquid crystal arrangement randomness on the location where the blind via 11 is, making the optical path be scattered to a certain extent, thereby prevent from occurrence of a Newton's ring or a rainbow pattern and further improves the recognition effect of the under-display camera.

The Second Embodiment

Figure 4:
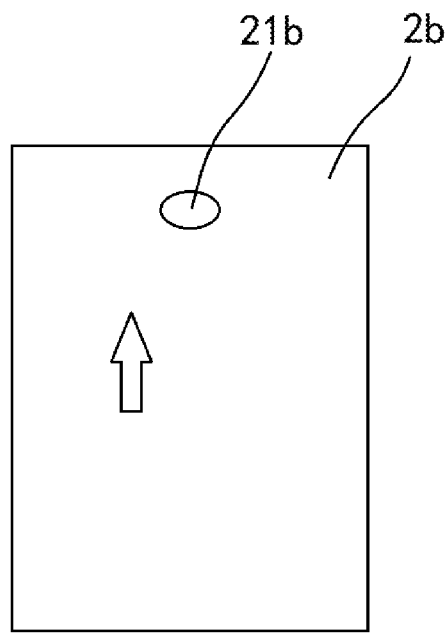
FIG. 4 is a top view of the alignment plate in the second embodiment of the present disclosure, a direction of an arrow in the figure is the printing direction.

As illustrated in FIG. 4, the difference between the second embodiment and the first embodiment is: in the second embodiment, it is necessary to consider the deformation problem of the alignment plate 2b during a printing process, therefore, it is necessary to be considered at the time of designing, so along a printing direction, the radius of the opening 21b needs to be deducted from the deformation value of about 0 um to 2000 um, that is, at the time of design, the opening is an oval hole, a short radius of the oval hole is along a direction parallel to the printing direction, a long radius of the oval hole is along a direction perpendicular to the printing direction. The long radius of the oval hole ranges from R−5000 um to R+5000 um, and the short radius of the oval hole shorter than the long radius of the oval hole ranges from 0 um to 2000 um.

To clearly interpret the present disclosure, the present disclosure further provides an alignment coating method for a substrate, which specifically includes the following steps, wherein each component or device please refer to FIG. 1 and FIG. 4, and the alignment coating structure for the substrate please refer to FIG. 3.

Providing a substrate 1 and an alignment plate 2b, and each of the substrates 1 has a blind via 11, the alignment plate 2b has at least one opening 21b. The opening 21b is an oval hole.

Covering the alignment plate 2b on to the substrate 1, and the opening 21b corresponds to the blind via 11, and a center of the blind via 11 is aligned to a center of the opening 21b to ensure an accuracy of follow-up printing, making a region out of the blind via 11 where the other region of the substrate 1 can be printed polyimide liquid in printing.

Coating polyimide liquid on the alignment plate 2b, through a printing mechanism 3 to transfer the polyimide liquid on the alignment plate to a region out of the blind via 11 on the substrate 1 according to a preset printing direction.

The Third Embodiment

Figure 5:
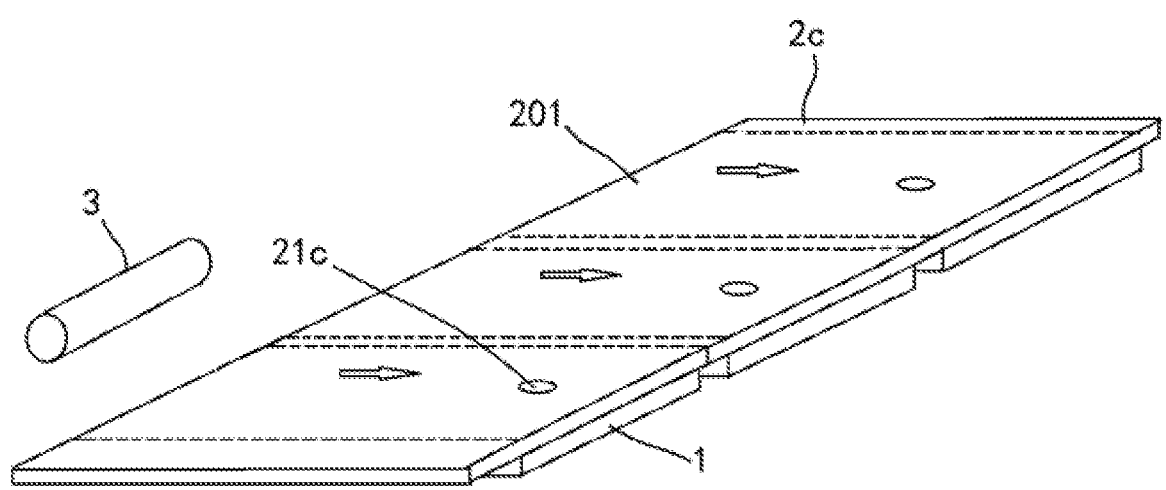
FIG. 5 is an alignment coating structure schematic diagram of the alignment plate in the third embodiment of the present disclosure, a direction of an arrow in the figure is the printing direction.

As illustrated in FIG. 5, the difference between the third embodiment and the first embodiment is, the third embodiment provides a plurality of substrates 1, and the substrates 1 are arranged in array, the alignment plate 2c has a same number of printing units 201 as the substrates 1, and each of the printing units 201 has one of the openings 21c, and each of the printing units 201 corresponds to one of the substrates 1, and each of the openings 21c on the printing unit 201 corresponds to the blind via 11 on the substrate 1. The design of the blind via 11 can refer to the design in the second embodiment, and can also can refer to the design in the first embodiment, and will not give unnecessary details.

To clearly interpret the present disclosure, the present disclosure further provides an alignment coating method for a substrate, which specifically includes the following steps, wherein each component or device please refer to FIG. 1 and FIG. 5.

Providing a plurality of substrates 1 and an alignment plate 2c, and each of the substrates 1 has a blind via 11, the alignment plate 2c has at least one opening 21c. The opening 21c is an oval hole.

Arranging all the substrates 1 in array; when correspondingly covering the alignment plate 2c on to the substrate 1, making each of the printing units 201 corresponds to one of the substrates 1 and each of the openings 21c on the printing unit 201 corresponds to the blind via 11 on the substrate 1.

Covering the alignment plate 2c on to the substrate 1, and the opening 21c corresponds to the blind via 11. In this embodiment, a center of the blind via 11 is aligned to a center of the opening 21c to ensure an accuracy of follow-up printing, making a region out of the blind via 11 where the other region of the substrate 1 can be printed polyimide liquid in printing.

Coating polyimide liquid on the alignment plate 2c, through a printing mechanism 3 to transfer the polyimide liquid on the alignment plate to a region out of the blind via 11 on the substrate 1 according to a preset printing direction.

The above is only the preferred embodiments and is not intended to limit the present disclosure, and any modifications, equivalents, and improvements made within the spirit and scope of the present disclosure should be included in the scope of the present invention.

What is claimed is:

1. An alignment coating method for at least one substrate, comprising:
   providing the at least one substrate and at least one alignment plate, wherein each of the at least one substrate has a blind via, the at least one alignment plate has openings, wherein a radius of the blind via is R, and a radius of the openings ranges from R−5000 um to R+5000 um;
   covering the at least one alignment plate on to the at least one substrate, wherein at least one of the openings corresponds to the blind via;
   coating polyimide liquid on the at least one alignment plate;
   transferring the polyimide liquid on the at least one alignment plate to a region out of the blind via on the at least one substrate according to a preset printing direction through a printing mechanism.

2. The alignment coating method for the at least one substrate as claimed in claim 1, wherein when there are a plurality of substrates, arranging the plurality of substrates in an array;
   the at least one alignment plate has a same number of printing units as the plurality of substrates, and each of the printing units has one of the openings,
   when covering the at least one alignment plate on to the plurality of substrates, making each of the printing units to correspond to one of the plurality of substrates, and each of the openings on the printing units corresponds to the blind via on the plurality of substrates.

3. The alignment coating method for the at least one substrate as claimed in claim 1, wherein the blind via is a circular hole; one of the openings is a circular hole; when covering the at least one alignment plate on to the at least one substrate, a center of the blind via is aligned to a center of the openings.

4. The alignment coating method for the at least one substrate as claimed in claim 1, wherein one of the openings is an oval hole, a short radius of the oval hole is along a direction parallel to the printing direction, a long radius of the oval hole is along a direction perpendicular to the printing direction; the blind via is a circular hole; the long radius of the oval hole ranges from R−5000 um to R+5000 um, and the short radius of the oval hole shorter than the long radius of the oval hole ranges from 0 um to 2000 um; when covering the at least one alignment plate on to the at least one substrate, a center of the blind via is aligned to a center of the openings.

* * * * *